Dec. 22, 1942.  H. C. IRVIN  2,305,702
SLIPPER BEARING
Filed Sept. 29, 1941  2 Sheets—Sheet 1
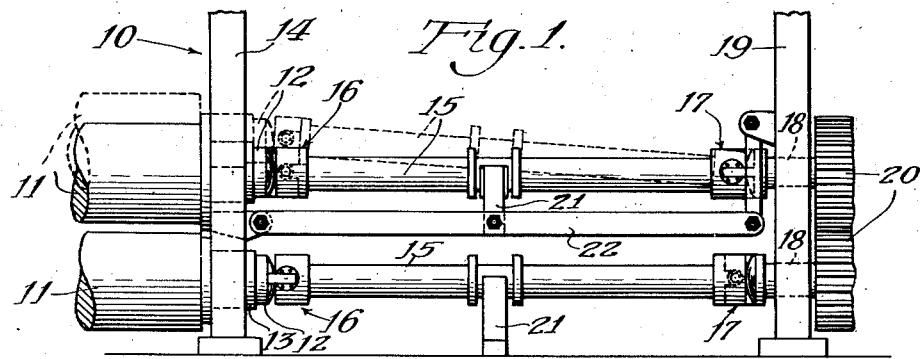
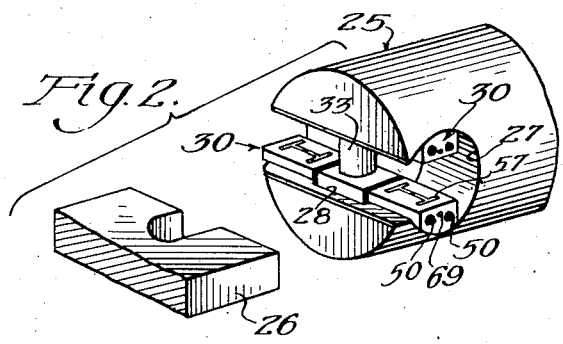
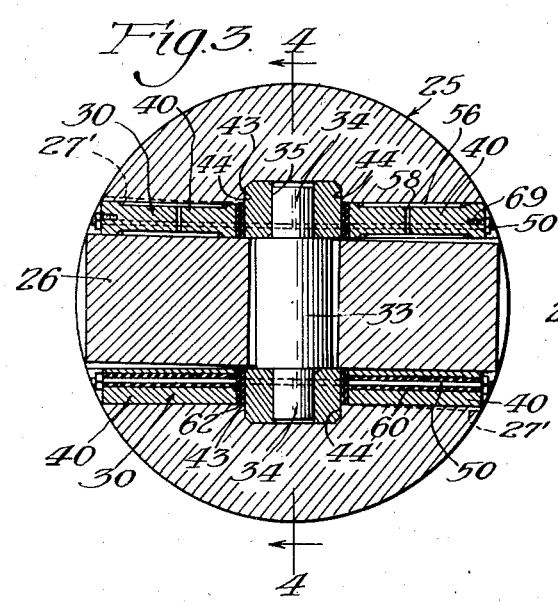
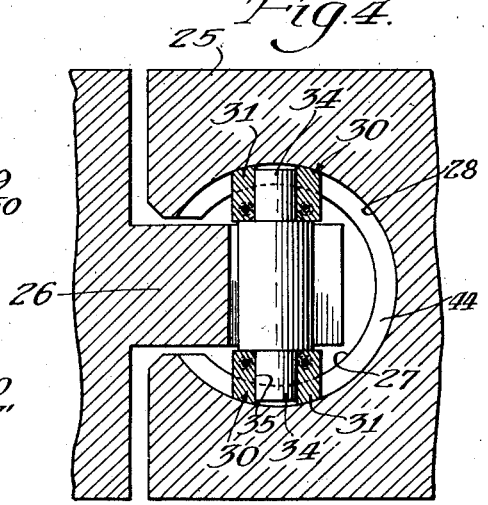
Inventor:
Harry C. Irvin
By Wallace & Cannon
Attorneys Dec. 22, 1942.  H. C. IRVIN  2,305,702

SLIPPER BEARING

Filed Sept. 29, 1941  2 Sheets-Sheet 2

Inventor:
Harry C. Irvin
By Wallace & Cannon
Attorneys

Patented Dec. 22, 1942

2,305,702

UNITED STATES PATENT OFFICE 2,305,702

SLIPPER BEARING

Harry C. Irvin, Detroit, Mich., assignor to The American Brake Shoe and Foundry Company, Wilmington, Del., a corporation of Delaware Application September 29, 1941, Serial No. 412,740

10 Claims. (Cl. 64—7)

This invention relates to bearings and particularly to slipper bearings for universal couplings and the like.

The rotative transmission of mechanical power includes many instances in which torque is imparted from a driving shaft to an independently supported shaft and under such circumstances the independence of support or the need for relative adjustment of one or the other of the shafts often results in misalignment of the two shafts. Where such a condition is to be met it is necessary to interconnect the shafts by universal couplings or the like to provide for a continuous driving connection between the shafts despite the existence of such an angular relation therebetween. One conventional form of universal coupling that has been widely used for the transmission of relatively heavy loads cooperating male and female members are respectively formed on or secured to the adjacent ends of the shafts, the male member including a flat tongue or fishtail which is inserted into a bifurcation afforded in a female member. The branches of the bifurcated female member are arcuately recessed transversely thereof and such recesses are located so as to be disposed in opposing relation to the opposite side faces of the tongue when the tongue is inserted into the bifurcation, thereby to define a pair of opposed semi-cylindrical pockets located on opposite sides of the tongue. Each of the aforesaid pockets or recesses serves to receive a slipper bearing, and such bearing has a convex surface that conforms to the configuration of the recess and also a flat face that conforms to an adjacent face of the aforesaid tongue, and a bearing pin which passes through a suitable opening in the tongue serves to maintain such slipper bearings in spaced relation. Where the shafts are rotated under circumstances where they are not in axial alignment, the angular relation of the tongue and female member changes constantly whereupon the slipper bearings rock within the recesses in the female member and the tongue pivots about the bearing pin whereby two angularly related axes are afforded about which the associated shafts may pivot in the course of such rotation.

Intermediate the ends of such slipper bearings it is customary to provide a boss which has an opening therein which serves as a socket to receive an end of the bearing pin, and usually this boss is of greater thickness than the end portions of the bearing. Correspondingly, the portions of the recesses or arcuate bearing portions of the female member which mate with the slipper bearings are more deeply recessed at the medial parts thereof than are the remaining parts thereof to thereby form an arcuate groove which accommodates the thickened boss when the end portions of the bearings are in bearing contact with the end portions of the recesses.

In the operation of universal couplings of the aforesaid character it has been found that the major portion of the wear attendant to operation of the coupling occurs at or near the end portions of the slipper bearings and the parts of the female member with which such end portions cooperate, the amount of wear becoming progressively greater toward the outer edges of the coupling. Where the female portions are worn as aforesaid and it becomes necessary to replace one slipper bearing with another, there are instances where, until the new slipper bearing wears down so as to conform to the worn portions of the female member, the slipper bearing will be subjected to appreciable stresses and strains.

The wear of the female bearing portion of the coupling may vary considerably in various coupling installations, and when a slipper bearing is placed in an operative relation in a worn coupling, the application of driving torque between the two members of the coupling tends to bend the slipper bearing so as to conform with the worn surface of the female member of the coupling. This action tends to produce breakage of the slipper bearing adjacent the central portion thereof and since such slipper bearings usually embody a central boss which cooperates with the arcuate groove in preventing endwise displacement of the bearings, such breakage takes place at or near the juncture of the end portions of the slipper bearing with the boss portion thereof.

Another type of stress is often encountered in the use of slipper bearings of the aforesaid type, such stress being caused by endwise shifting or pounding of the drive spindle when the supporting bearings fail to accomplish their intended purpose. In such endwise pounding of the drive spindle the fishtail exerts a substantial pounding action upon the bearing pin of the slipper bearing assembly, tending to displace the slipper bearings transversely of the arcuate recesses of the female member of the coupling. Since the boss portion of each slipper bearing is normally spaced from the bottom of the groove in which the boss portion rides, the boss portions are, in such conventional slipper bearings, usually ineffective to absorb or resist the pounding forces exerted by the spindle in its endwise shifting or pounding movement. As a result, this force must be resisted by the engagement of the end portions of the slipper bearing with the arcuate bearing surfaces of the female portion of the coupling. The location or spacing of such points of engagement may vary considerably but are in every instance spaced in opposite directions from the point of engagement of the spacing or bearing pin with the central boss. Hence the slipper bearings in such an instance act as beams supported at spaced points between which the bearing pin exerts a substantial pounding or loading force. This action often results in breakage of the slipper bearing transversely thereof and substantially through the central opening of the boss.

In my copending application, Serial No. 412,737, filed September 29, 1941, I have disclosed and claimed slipper bearing structure which overcomes the foregoing difficulties, and it is the object of the present invention to enable these difficulties to be avoided through the use of a simplified and more economical structure.

More particularly, it is an object of the invention to provide a three-piece slipper bearing in which each end section is interconnected with the boss of the bearing in a simple and effective manner which enables the bearing to transmit torque without the production of breaking stresses when worn couplings are encountered; and a related object is to so construct such a slipper bearing that the end sections may be readily removed and replaced as wear conditions require.

The features, hereinabove referred to, of interconnecting the parts of a slipper bearing for relative movement and rendering the end sections thereof removable are disclosed in the co-pending applications of Thomas J. Healy, Ser. Nos. 412,750 and 412,751, respectively, both filed September 29, 1941, and the present invention relates to improvements over the inventions there disclosed.

Other and further objects of the present invention will be apparent from the following description and claims and will be understood by reference to the accompanying drawings which, by way of illustration, show a preferred embodiment and the principle thereof and what I now consider to be the best mode in which I have contemplated applying that principle. Other embodiments of the invention embodying the same or equivalent principle may be used and structural changes may be made as desired by those skilled in the art without departing from the present invention and the purview of the appended claims.

In the drawings,

Fig. 1 is a fragmental elevational view of a portion of a rolling mill;

Fig. 2 is a fragmental perspective view of a universal coupling in partially disassembled condition, showing the manner in which one form of my novel slipper bearing structure is embodied in the coupling;

Fig. 3 is an enlarged cross-sectional view of the aforesaid universal coupling;

Fig. 4 is a longitudinal sectional view of the coupling taken on the line 4—4 on Fig. 3;

Figure 5:
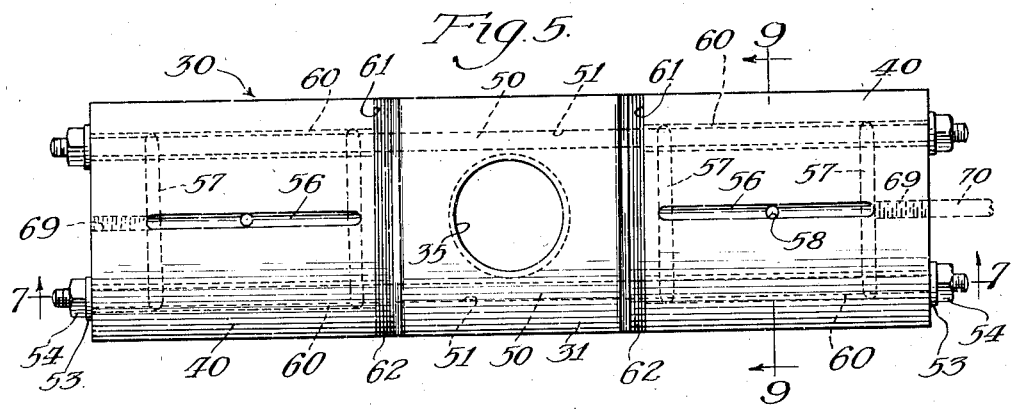
Fig. 5 is a plan view of one of the slipper bearings of Figs. 2, 3 and 4.

One common use for slipper bearings of the character to which the present invention relates is found in the roll driving means for the continuous type of steel rolling mills and the like, such as the mill 10 fragmentally illustrated in Fig. 1. The rolling mill 10 comprises a pair of opposed rolls 11 having reduced end portions or pintles 12 extending through and journaled in bearings 13 carried by frame members as 14, and these pintles 12 are connected by universal couplings 16 to the ends of drive spindles 15. The other ends of the spindles 15 are connected by universal couplings 17 to stub shafts 18 journaled in a frame member 19, and rotation is imparted to the stub shafts 18 by the driving means which includes gearing 20 fixed to the shafts 18. To afford adjustability of the rolls 11 in accordance with the thickness of the material that is to be worked upon, the bearings as 13 are arranged to be vertically positioned at selected points in the frame members as 14. Thus the upper roll 11 may be adjusted from the full-line position thereof in this view to accommodate a greater thickness of material, thus causing the upper spindle 15 to assume the position indicated by broken lines so that this spindle 15 is angularly disposed with respect to the associated pintle 12 and stub shaft 18. The lower spindle 15 is supported at its middle by a thrust or spindle carrier bearing 21 which is supported in any suitable manner. The upper roll 11, and as the position of the upper spindle 15 is changed in the manner just described the bearing 21 is correspondingly re-positioned and maintained in an operative spindle supporting relationship.

The universal couplings 16 and 17 which interconnect the spindles 15 with the rolls 11 and stub shafts 18 afford driving connections between these various rotatable members even though they are not longitudinally aligned with each other. As shown in detail in Fig. 2, each universal coupling comprises a female member 25 which is formed on or secured to an end of a spindle as 15, Fig. 1, and a male member 26 which is provided on the adjacent end of an associated stub shaft as 18 or a pintle as 12. The male member 26 is in the form of a flat tongue that may be inserted into a bifurcation in the female member 25. Arcuate or cylindrical recesses 27, Figs. 2, 3 and 4, are formed in the branches of the bifurcation in the female member 25 and extend transversely to the free edges thereof, and deeper recesses 28 concentric with the recesses 27 are afforded in the member 25 between the free ends of the semi-cylindrical openings defined by the recesses 27.

A pair of slipper bearings 30 are respectively interposed between the tongue 26 and the arcuate recesses in the branches of the bifurcation in the female member 25, as shown in Fig. 3, each such slipper bearing 30 having flat and convex surfaces to conform respectively with the tongue 26 and the arcuate recesses in the female member 25. The medial or boss portion 31 of each slipper bearing 30 is of greater thickness than the end sections 40 of the bearing, and these bosses 31 seat in the deeper recesses 28 while the end sections 40 are seated in the recesses 27. The bosses 31 of the slipper bearings 30 are interconnected and maintained in spaced relation with each other by a bearing pin 33 having reduced end portions 34 which are received in socket openings as 35 in these bosses, the pin 33 passing through a suitable slot or other opening 37 in the tongue 26.

Where the shafts which are interconnected by a universal coupling 16 or 17 are not axially aligned, as is the case when the upper spindle is in the broken-line position thereof shown in Fig. 1, the slipper bearings 30 are rocked back and forth in their recesses 27 and 28, Figs. 3 and 4, as the angular position of the tongue 26 with respect to the female member 25 changes in the course of rotation of these parts. However, longitudinal movement of the slipper bearings 30 is prevented by end faces 43 of the bosses 31 which are engaged by the shoulders 44, Fig. 4, intermediate the receses 27 and 28 in the female member. Thus, the tongue 26 may pivot about two axes, one being afforded by the bearing pin 33 and the other by the generally cylindrical or concentric surfaces of the recesses 27 and 28 in which the slipper bearings are seated.

As is indicated in somewhat exaggerated fashion in Fig. 3, the rotative force or reaction exerted by the tongue 26 upon each slipper bearing 30 is borne substantially entirely by only one of the end sections 40 of each such bearing in instances where the directions of rotation remain substantially constant. These heavily stressed end sections 40 of the slipper bearings 30 and the cooperating portions of the female member 25 undergo a relatively rapid rate of wear, and this wear is greatest on both of the opposed load-transmitting surfaces adjacent to the ends of the slipper bearings. As the support for such end sections becomes weakened due to changes in the configuration of the mating surfaces there is a tendency for these end sections to bend relative to the bosses 31 of the slipper bearings, particularly when these bosses are firmly seated in the recesses 28 in the manner explained hereinafter. As stated hereinabove, it is a purpose of the present invention to enable such bending movement and relative readjustment of the more heavily stresed end sections 40 to take place without unduly straining the slipper bearing assembly.

In accordance with the present invention the end sections 40 of each slipper bearing 30 are detachably secured to the boss 31 thereof so as to render each end section 40 capable of independent shifting movement relative to the boss 31 in such a manner as to enable each such end section 40 to adjust itself independently to the configuration of the cooperating arcuate bearing surface 27 in the female member 25 of the coupling without placing an undue strain upon the slipper bearing assembly. This is attained by means which also functions to maintain the elements of the slipper bearing assembly in a normal relationship which simplifies the coupling operation and facilitates mounting of the slipper bearing assembly in the coupling.

Figure 6:
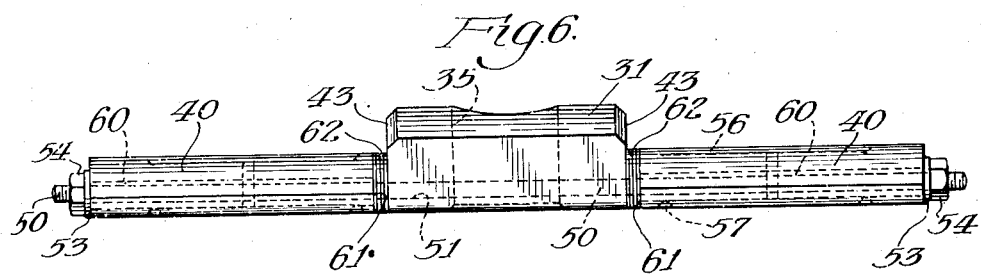
Fig. 6 is a front elevational view of the slipper bearing shown in Fig. 5.
Figure 7:
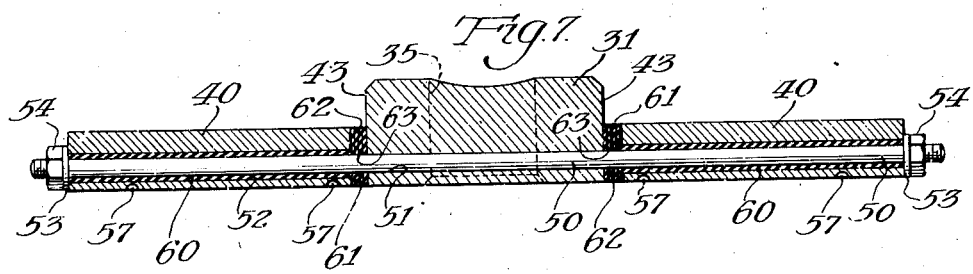
Fig. 7 is a longitudinal sectional view taken on the line 7—7 on Fig. 5.
Figure 8:
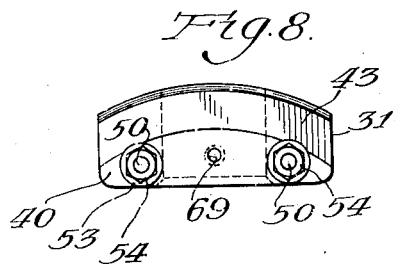
Fig. 8 is an end elevational view of the slipper bearing looking from the right in Fig. 6.
Figure 9:
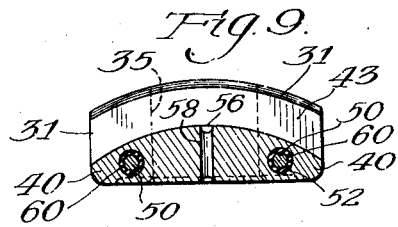
Fig. 9 is a cross-sectional view of the slipper bearing taken along the line 9—9 of Fig. 5.

Thus as shown in detail in Figs. 5 to 9 inclusive of the drawings the end sections 40 and the boss 31 of each slipper bearing are held in assembled operative relation by means which includes resilient elements located so as to afford limited independent movement of the end sections 40 relative to the boss 31 while tending at all times to maintain the three bearing sections in their normal relationship of Figs. 5, 6 and 7.

In attaining such a relationship elongated securing means such as rods or bolts 50 are passed through axially aligned openings 51 and 52 formed respectively in the boss 31 and end sections 40, and removable fastening means such as washers 53 and nuts 54 are provided on the ends of the bolts 50 to hold the three bearings parts against endwise separation. In the present instance two such bolts 50 are employed, and the openings 51 and 52 in which they are disposed are so arranged as to clear the central opening 35 of the boss 31, as will be evident in Fig. 9 of the drawings.

Lubricating grooves 56 and 57 are also provided on the arcuate faces and flat faces respectively of the end sections 40, and these grooves may be arranged in any preferred manner which provides adequate spacing between the grooves and the openings 52. As herein shown the grooves 56 and 57 are connected by a bore 58.

The connection of the end sections 40 and the boss 31 is such that limited independent shifting movement of the end sections 40 is afforded when worn bearing surfaces 27 are encountered, and, where the elongated securing means are rigid in character as are the bolts 50, this end is attained through the provision of resilient means such as sleeves 60 mounted within the bores or openings 52 of the end sections 40 so as to be interposed between the bolts 50 and the walls of the openings 52. The sleeves 60 may be made of any desired resilient material, such for example as soft rubber or suitable rubber substitutes, and when mounted as aforesaid, these resilient sleeves 60 provide for movement of the end sections in a direction generally perpendicular to the axes of the bolts 50.

Where the female bearing surface 27 has been worn unevenly it is found that each load transmitting end section is stressed so as to tend to bend or shift the same relative to the boss 31, to thereby seat the end sections firmly upon the worn bearing surfaces, and such relative pivotal movement is rendered possible in the present slipper bearing by so spacing the inner end faces 61 of the end sections from the adjacent faces 43 of the boss 31 that uneven compression of the resilient sleeves 60 may take place. Thus the end sections 40 may, in effect, pivot relative to the boss 31 so as to conform with worn bearing surfaces 27.

While various means might be employed to effect the desired spacing of the end sections 40 from the boss 31, I prefer to employ resilient spacer blocks 62 made from a material such as soft rubber. Such spacer blocks 62 may be held in place by the bolts 50, suitably positioned holes 63 being provided in the blocks 62, as shown in Fig. 7, for the passage therethrough of the bolts 50. Thus when an end section 40 is shifted with a pivotal or other uneven action, the resilient sleeves 60 and the resilient spacer block 62 may be compressed as required. When the bending or shifting stresses are relieved, however, the three parts of the slipper bearing resume their normal relationship, due to the resiliency of the connections therebetween.

Thus, in effect, a hinged or pivoted connection is afforded between each end section 40 and the boss 31 of the slipper bearing 30, and since the axis of such pivoting may vary or is in a sense indeterminate, this enables the slipper bearing to give satisfactory service despite badly worn conditions of the end sections of the bearing or of the cooperating portions of the female member 25. For example, assuming that the portions of the arcuate bearing surface 27 of the female member 25 cooperating with the more heavily stressed end sections 40 of the slipper bearing 30 have been relieved due to wear, as indicated at 27' in a somewhat exaggerated manner in Fig. 3, these end sections 40 may nevertheless be urged by the tongue 26 into intimate contact with the bearing surface 27 without any tendency to strain the slipper bearing assembly as a whole.

In those instances where the couplings or other elements of the driving connection have become so worn as to allow endwise shifting or pounding movement of the spindle 15, it has been found that detrimental and destructive forces are applied to the slipper bearings. In such shifting movement of the spindle 15 the pounding action of the spindle is exerted through the tongue 26 upon the bearing pin 33 transversely of the bearing pin, and this force is in turn exerted upon the boss portions by the bearing pin. In slipper bearings as heretofore constructed it has been the practice to so form the boss portions 31 as to space the arcuate outer surface thereof from the arcuate bottom surface of the groove 28, and hence the boss portions 31 have been ineffective under such circumstances to resist the force thus applied through the bearing pin 33. Such forces have therefore been resisted by engagement of the end portions of the slipper bearings with the arcuate bearing surfaces 27. In most instances the engagement of the end portions of the slipper bearings with the bearing surfaces 27 occurs at points spaced at substantial distances on opposite sides of the reduced ends 34 of the bearing pin and hence the force exerted by the bearing pin 33 has been applied to the slipper bearing so as to stress the slipper bearing as a simple beam. This action often results in breakage of the slipper bearing at substantially the mid point of the boss section or, in other words, through the pin receiving opening such as the opening 35.

With the slipper bearing of the present invention, this objectionable result is avoided by so constructing and arranging the slipper bearings and the resulting slipper bearing assembly that the slipper bearings resist these pounding forces without the aforesaid beam action in the slipper bearings. This end is attained through the formation of the boss section 31 of such thickness that its arcuate surface 32 may seat against the bottom of the groove 28 when a pounding force is exerted thereon due to endwise shifting of the spindle 15. It will be noted in this connection that the ends 34 of the pin 33 are so formed, Figs. 3 and 4, that the pin ends do not engage the bottom of the groove 28. In obtaining this seating or bottoming action of the bosses it will be observed that when the spindle shifts to the right in Fig. 4, it engages the bearing pin 33 so as to move the two boss portions 31 more firmly into seating engagement with the bottom of the groove 28. Hence the two boss portions 31 ride along converging arcuate surfaces of the groove 28 and are forced toward each other and into firm engagement with the oppositely facing shoulders formed on the pin 33, and as a result the endwise movement of the spindle 15 is limited by a wedging action of the two boss portions in the groove 28.

The construction and arrangement of slipper bearings and the slipper bearing assembly to afford such wedging action of the bosses 31 is described and claimed in my aforesaid copending application, Serial No. 412,737, and it is to be observed that in the slipper bearings of the present invention the end sections are so joined and related to the boss as to permit relatively free readjustment with the result that the wedging of the bosses may be accomplished freely and without the production of related or resulting stresses in other parts of the slipper bearings. Hence the bosses 31 cooperate with the pin 33 and with the resilient character of the connecting means in resisting the endwise pounding forces independently of the end sections of the slipper bearings.

Inasmuch as one of the end sections 40 may tend to wear more than the other end sections in a particular slipper bearing, it may become advantageous to replace a worn or otherwise damaged end section. When an end section 40 of the present slipper bearing becomes excessively worn it may be removed from the coupling in which it is mounted without disassembling the coupling, and to do this it is merely necessary to loosen and remove the adjacent securing nuts 54 to enable withdrawal of such an end section. In order to facilitate removal of the end sections 40 from the slipper bearing assembly, tapped openings 69 are provided in the outer ends of the end sections 40 so that a tool as 70, Fig. 5, having a threaded shank may be screwed into the tapped opening 69 of an end section 40, whereupon this end section may be conveniently withdrawn from the coupling.

From the foregoing description it will be apparent that I have provided an improved and simplified slipper bearing structure which is so arranged that when the more heavily stressed end section of a slipper bearing is engaged by the male tongue of the universal coupling in the course of transmitting torque between the male and female members, such end section may yield unitil it receives the support of the cooperating female bearing surface without placing any undue strain upon the bearing structure as a whole. Moreover, the present slipper bearing prevents breakage of the slipper bearings due to endwise pounding of the spindle, and worn end sections in the slipper bearings may be readily and easily replaced without uncoupling the connected rotative members. These advantages are attained in the present instance by making the slipper bearings of three-piece construction which preserves the general form of the conventional one-piece slipper bearings heretofore employed in universal couplings. Therefore, slipper bearings constructed in accordance with my invention may be employed in existing universal couplings without necessitating any redesigning or reshaping of the male and female members thereof.

Since the rubber sleeves may be compressed unevenly on any side of the associated connecting bolts, the axis of the pivotal readjusting movement of an end section is indeterminate, and hence an end section may be brought into maximum bearing contact with the opposed female bearing surface of the coupling. Such readjusting movement of an end section in the present slipper bearing is accomplished without producing undesired and objectionable stresses in the central boss or in the end section, the shifting movement serving merely to compress the resilient elements in the amount required. It will be observed, of course, that the component parts of the present slipper bearing are simple in character so as to enable the slipper bearings to be economically produced, and yet, these simple and economical elements cooperate to produce exceptional performance characteristics in the slipper bearings.

Thus, while I have illustrated and described a selected embodiment of my invention, it is to be understood that this embodiment is capable of variation and modification and I therefore do not wish to be limited to the precise details set forth but desire to avail myself of such changes and alterations as fall within the purview of the following claims.

I claim:

1. In a universal coupling including a bifurcated female member and a male member comprising a flat tongue adapted to be received in such bifurcation and which tongue has an opening therein for the reception of a bearing pin and wherein the branches of the bifurcation have opposed arcuate recesses therein that extend transversely and to the free edges thereof and which recesses are deepened at medial parts thereof to form an arcuate groove, the combination of a pair of slipper bearings respectively disposed in the arcuate recesses and including central boss portions located within said groove and separately formed end portions having convex faces to conform with and bear against other portions of said arcuate recesses and also having flat faces respectively disposed toward and bear against opposed flat faces of said tongue, a bearing pin extended through the opening in said tongue and into the medial parts of said bearings, and resilient means and at least one cooperating connecting bolt operable to secure said boss and end sections together for limited relative movement and operable to urge said end sections toward a predetermined relation with respect to said boss.

2. In a universal coupling including a bifurcated female member and a male member comprising a flat tongue adapted to be received in such bifurcation and which tongue has an opening therein for the reception of a bearing pin and wherein the branches of the bifurcation have opposed arcuate recesses therein that extend transversely and to the free edges thereof and which recesses are deepened at medial parts thereof to form an arcuate groove, the combination of a pair of slipper bearings respectively disposed in the arcuate recesses and including central boss portions located within said groove and separately formed end portions having convex faces to conform with and bear against other portions of said arcuate recesses and also having flat faces respectively disposed toward and bear against opposed flat faces of said tongue, a bearing pin extended through the opening in said tongue and into the medial parts of said bearings, and connecting means securing said end sections and said boss together, said connecting means having resilient means associated therewith whereby said boss and end sections are enabled to move relative to each other and are constantly urged toward a predetermined normal relationship.

3. In a universal coupling including a bifurcated female member and a male member comprising a flat tongue adapted to be received in such bifurcation and which tongue has an opening therein for the reception of a bearing pin and wherein the branches of the bifurcation have opposed arcuate recesses therein that extend transversely and to the free edges thereof and which recesses are deepened at medial parts thereof to form an arcuate groove, the combination of a pair of slipper bearings respectively disposed in the arcuate recesses and including central boss portions located within said groove and end portions having convex faces to conform with other portions of said recesses and also having flat faces respectively disposed toward opposed flat faces of said tongue, and a bearing pin extended through the opening in said tongue and into the medial parts of said bearings, said pin having oppositely facing shoulders thereon acting to space said boss portions apart so that as an incident to the application of a force to said pin transversely thereof and generally toward said groove said boss portions are bottomed in said arcuate groove and are wedged against said shoulders to thereby limit and resist relative endwise approaching movement of said male and female members of the coupling, and means including resilient elements connecting said end portions to said boss portion for relative movement in a direction substantially perpendicular to said flat faces whereby to enable said boss portions to bottom in said arcuate groove and attain said wedging action under widely varying conditions of wear in said coupling and permit relative pivotal movement of said end sections to conform with worn cooperating bearing surfaces of the female member of the coupling, the resilient elements of said connecting means being operable to urge said end sections to normal positions facilitating coupling of the male and female members.

4. A slipper bearing of the character described comprising a boss, at least one end section disposed at one side of said boss, resilient means between said boss and said end section operable normally to maintain a predetermined spaced relation therebetween, and connecting means normally holding said boss and said end section together against opposite sides of said resilient means, said connecting means being constructed and arranged to afford limited shifting movement between said end section and said boss.

5. A slipper bearing of the character described comprising a boss, two separate end sections respectively disposed at opposite sides of said boss, said boss and said end having axially aligned openings formed therethrough, bolts extending through said openings and having releasable means thereon operable to hold said end sections thereon, resilient means within the openings in said end sections operable to locate said end sections in predetermined positions laterally with respect to said bolts, and resilient means acting between said boss and said end sections and operable yieldingly to resist approaching movement thereof and to maintain a predetermined spaced relation therebetween.

6. A slipper bearing of the character described comprising a boss portion, two separate end sections disposed at opposite sides of said boss and extending therefrom, resilient cushioning blocks disposed between said end sections and said boss portion, means including at least one bolt extending through each end section and the adjacent cushioning block and securing them to said boss, and resilient sleeves surrounding said bolts within said end sections to thereby enable relative shifting of said end sections relative to said boss.

7. A slipper bearing of the character described comprising a boss portion, at least one end section disposed at one side of said boss and extending therefrom, and resilient means forming a connection between said boss and said end section whereby said end section is enabled to shift relative to said boss while being constantly urged toward a normal relation to the boss.

8. A slipper bearing of the character described comprising a boss, two end sections disposed at opposite sides of said boss, said boss and said end sections having aligned openings therethrough, resilient sleeves disposed within the openings in said end sections, and means including bolts extending through said sleeves and the aligned openings in said boss and operable to secure said boss and end sections together.

9. A slipper bearing as set forth in claim 8, in which end sections and said boss are spaced apart by means affording effective clearance therebetween to permit relative pivotal movement.

10. An end section adapted to form an element of a multisection slipper bearing for use in a universal coupling and comprising a substantially rectangular body having side and end edges and oppositely disposed bearing faces, one of said bearing faces being substantially flat and extended to said side and end edges and the other of said bearing faces extending between said end edges and being arcuate transversely of said side edges and extended thereto, said body having at least one opening extended therethrough from the end edges thereof and having at least one other opening therein extended in parallel relation with the first named opening and inwardly from one end edge thereof which constitutes the inner end of the end section when in use in a coupling, said openings being adapted to receive means for securing said element to, and locating it with respect to, other of the sections of the bearing, and resilient sleeves positioned in said openings.

HARRY C. IRVIN.